Oct. 6, 1953   M. L. TANNENBAUM   2,654,089
COMBINATION CAP AND EYESHIELD
Filed Oct. 9, 1948
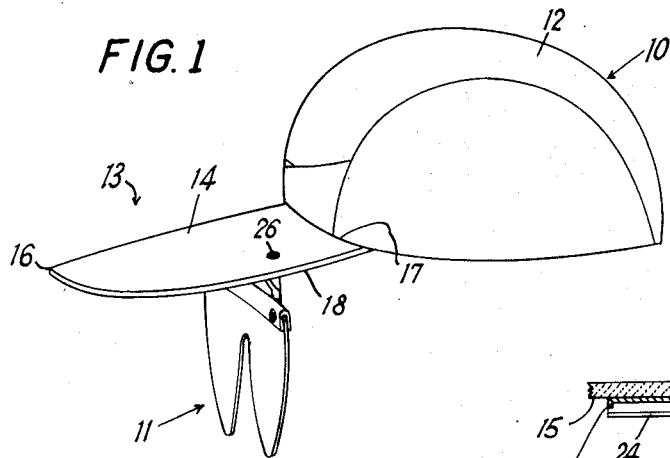
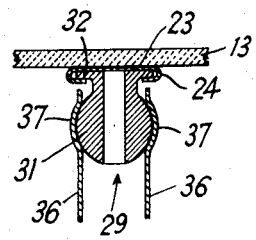
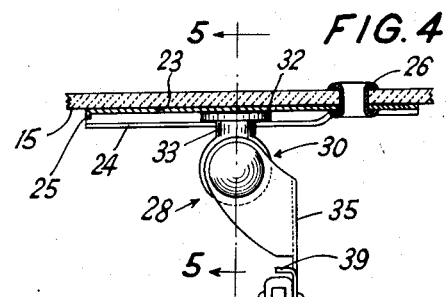
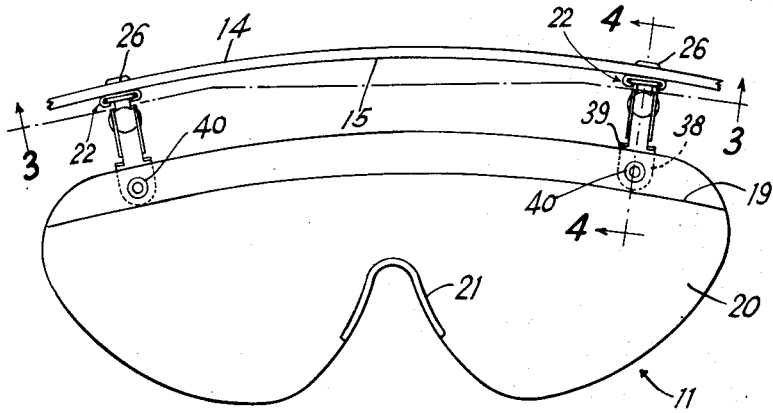
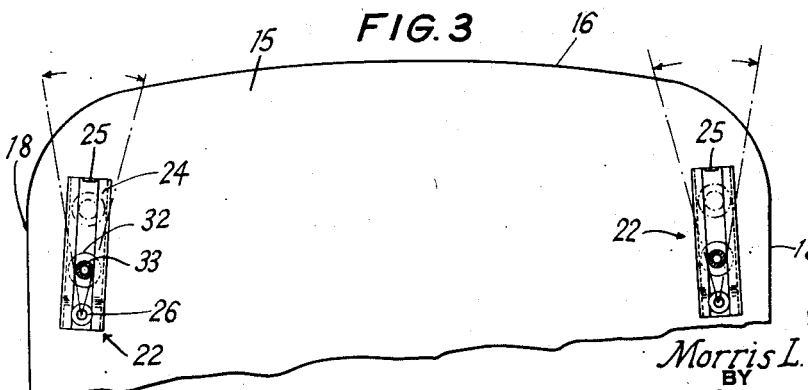
INVENTOR
*Morris L. Tannenbaum*
BY
*Philip G. Hilbert*
ATTORNEY Patented Oct. 6, 1953

2,654,089

UNITED STATES PATENT OFFICE 2,654,089

COMBINATION CAP AND EYESHIELD

Morris L. Tannenbaum, Bronx, N. Y.; Abraham J. Springer and William H. Wechter, executors of said Morris L. Tannenbaum, deceased, assignors to Clearasite Corporation of America, Inc., New York, N. Y., a corporation of New York Application October 9, 1948, Serial No. 53,659

5 Claims. (Cl. 2—10)

This invention relates to a combination cap and eyeshield.

Caps have been provided with eyeshields movably mounted on the underside of the cap visor, the mounting of the eyeshield on the visor being such that only angular movement of the eyeshield relative to the visor, is possible. Such constructions do not permit longitudinal adjustment of the eyeshield to suit the convenience of the cap wearer, particularly if the eyeshield in its extended position must be disposed in front of glasses or spectacles worn by the cap wearer. Accordingly, an object of this invention is to provide an eyeshield mounting for movably positioning an eyeshield on a cap visor or other base wherein the eyeshield may execute angular movement and additionally may be moved in a linear direction to adjusted positions relative to the edges of the visor or other base.

Another object of this invention is to provide a combination visor and eyeshield together with means for movably interconnecting the eyeshield to the visor whereby the eyeshield may be disposed closely adjacent the underside of the visor when the eyeshield is not in use and may be extended by angular movement thereof, to a position wherein the eyeshield is disposed before the eyes of the visor wearer, the interconnecting means being further adapted to permit adjusted longitudinal movement of the eyeshield in its extended position, the interconnecting means being also adapted to permit transverse shifting movement of the eyeshield in its extended position.

A further object of this invention is to provide a mounting for securing an eyeshield to a base, the mounting comprising a track member which is adapted to be swively secured to the base and a pair of universally and frictionally interengaging members, one of the interengaged members being movably mounted on the track member and the other interengaged member being adapted to be secured to the eyeshield, whereby the eyeshield may be moved through an arc of at least 90° relative to the base, may also be moved longitudinally relative to the base and further, may be moved transversely relative to the base through swivel movement of the track member.

Yet a further object of this invention is to provide a neat, durable eyeshield and mounting for attachment to visored caps or other bases, which shall be relatively inexpensive to manufacture, which may be readily adjusted for the conditions of use, is attractive in appearance and yet practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings, in which is shown illustrative embodiments of the invention:

Fig. 1 is a side elevational view of a cap having mounted thereon an eyeshield embodying the invention;

Fig. 2 is a front elevational view of the cap visor, showing the mounting for securing the eyeshield thereto;

Fig. 3 is a sectional view taken on the line 3—3 of Fig. 2;

Fig. 4 is a sectional view taken on the line 4—4 of Fig. 2 and

Fig. 5 is a sectional view taken on the line 5—5 of Fig. 4.

Referring in detail to the drawing, 10 designates a cap provided with a glareproof eyeshield 11 movably mounted thereon. The cap 10 includes a crown or head covering portion 12, from the fore portion of which extends the usual visor portion 13. The visor 13 comprises a top surface 14, a bottom surface 15, a curved outer edge 16 and a curved inner edge 17 where the visor is secured to the crown portion 12. The edges 16, 17 are interconnected by side edges 18.

The eyeshield 11 comprises a plastic frame portion 19 and a glareproof lens 20 mounted thereon. A nose piece 21 is affixed to a suitably cut out mid portion of lens 20. The lens 20 may be of a flexible sheet plastic material, suitably colored or otherwise treated to impart glareproof characteristics thereto. The frame 19 and nosepiece 21 may be of molded plastic material having a degree of rigidity.

Means is provided for movably attaching the eyeshield 11 to the visor 13. To this end there is provided a pair of similar track members 22 which are swively attached on the bottom surface 15 of the visor adjacent side edges 18 thereof, as shown in Fig. 3. Each of the members 22 comprises an elongated intermediate strip portion 23. Extending from the lateral edges of the strip 23 are inturned, U-shaped edge portions 24, oppositely disposed toward each other, as shown in Fig. 5. The forward edge of each strip 23 is formed with an upwardly extending tit 25 for the purpose hereinafter appearing. The track members 22 are attached to the visor 13 by means of rivets 26 which extend through registering apertures in the track member and visor. The aperture in the track member is formed adjacent the rear edge of the strip 23 while the apertures in the visor are disposed adjacent edges 18 thereof. The rivets 26 frictionally grip the track member relative to the visor and are adapted to permit swivelling or pivotal movement of the track members relative to the visor.

Slidably mounted on each of the track members 22 and depending therefrom is a universal hinged connector 28. Each connector 28 comprises a ball member 29 and a frictionally engaging socket member 30. The ball member 29 comprises a spherical portion 31, a circular base portion 32 and a neck portion 33 of reduced diameter, which interconnects the base portion to the spherical portion. The base portion 32 of the ball member is slidably mounted on the track member 22, the peripheral portion of the base being frictionally gripped between the inturned portions 24 and strip 23 of the track member. It is understood that each ball member 29 is adapted to rotate about an axis perpendicular to the plane of strip 23 while being frictionally gripped on the track member. Additionally, each ball member 29 is adapted to be moved back and forth on its track member, such movement being limited in one direction by the tit 25 and in the other direction by the turned over portion of tubular rivet 26.

Each socket member 30 comprises a wall 35 and a pair of parallel ears 36 extending from the side edges thereof and at right angles thereto. The ears 36 are inclined upwardly and outwardly as shown in Fig. 4 and are formed with similar, oppositely disposed depressions 37. The spherical portion 31 of each ball member 29 is received between the depressed portions of the ears 36 and frictionally gripped therebetween to allow universal movement between the ball and socket members.

Extending downwardly from the wall 35 of each socket member, is an attaching bracket 38 which is slightly wider than the wall 35. The upper ends of bracket 38, on either side of wall 35, are bent at right angles to form tongues 39. The eyeshield 11 is secured to attaching brackets 38 by means of tubular rivets 40 which extend through transverse apertures formed in spaced portions of frame 19 and registering apertures formed in brackets 38. The tongues 39 are disposed over the top edge of the frame 19.

It will be apparent that the eyeshield 11 may be moved angularly about hinges 28 through an arc of at least 90°. Thus the eyeshield may be positioned closely adjacent the undersurface 15 of the visor when there is no need for protecting the eyes of the visor wearer or when the cap is not being worn. The shield may be swung to a position where it is disposed before the eyes of the cap wearer, as shown in Fig. 1. The frictional engagement of the ball and socket members of the hinged connectors 28 allows the eyeshield to be adjusted to intermediate angular positions relative to the visor. The eyeshield will then be retained in the desired position.

Additionally, the eyeshield 11 together with the hinged connectors 28, may be moved longitudinally on track members 22 so as to adjust the position of the eyeshield as a whole relative to the edges 16 and 17 of the visor. This allows the wearer of the cap 10 to suitably adjust the position of the eyeshield while it is before the eyes of the cap wearer relative to the eyes. This is readily accomplished by pushing the connectors 28 along the track members 22 to a selected position thereon. The frictional grip of the track members on the base portions of the connectors 28, allows the connectors and attached eyeshield to be retained in a selected longitudinal position. Such longitudinal adjustment of the eyeshield is particularly advantageous in cases where the cap 10 is worn by one who also wears glasses which may interfere with the eyeshield when it is swung into its eye protecting position. Also, various individuals may prefer different longitudinal positions of the eyeshield to achieve a desired degree of comfort as well as eye protection.

Additionally, the eyeshield 11 together with connectors 28, may be moved transversely of the visor. This is done by swivelling or pivoting the track members 22 about rivets 26 as an axis. This allows adjusted movement of the eyeshield from one visor edge 18 to the other visor edge 18. As shown in Fig. 3, the track members are movable within an arc at least of the extent indicated by the arrows. The adjustment is quickly made by pushing the connectors 28 in the desired direction which in turn causes swivelling movement of the track members. The rotation of the base portions 32 of ball members 29 relative to the track members, facilitates the swivelling movement of the track members. The transverse movement of the eyeshield is desirable in cases of a corresponding horizontal shift in the glare producing source. The eyeshield is retained in a selected position by the frictional grip of the rivets 26 on the track members 22 and visor 13.

It is understood that the track members 22 and interengaged connectors 28 may be attached to any selected base whereby the eyeshield secured to the connectors may execute angular, linear or transverse movement relative to the base, in the manner previously described. While particularly described in conjunction with cap visors, the eyeshield 11 may be movably attached to any base whereby an individual in the vicinity of the base may have his eyes protected from glare.

The combined track member 22 and connector 28 may be used for interconnecting various bodies wherein relative angular, linear or transverse movement between the bodies may be desired.

It is understood that eyeshields other than the one piece lens type illustrated herein, may be used in the combination described and claimed herein.

It will thus be seen that there is provided a device and combinations thereof in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to protect by Letters Patent:

1. In combination, a visor member adapted to be positioned above the eyes of a wearer, a glareproof eyeshield member adapted to be positioned before the eyes of the wearer, and means for movably interconnecting said members at spaced points, each interconnecting means comprising a track member mounted on said visor member and a pair of universally interengaging members, one of said interengaging members including a portion slidably and rotatably mounted on said track member and the other of said interengaging members being secured to said eyeshield member, each of said track members being swivelly mounted on said visor member.

2. In the combination of a visor and a glareproof eyeshield mounted thereon, means for movably interconnecting said eyeshield to said visor comprising a pair of universally interengaging members and a track member, one of said interengaging members including means slidably and rotatably mounted on said track member, the other of said interengaging members being secured to said eyeshield and said track member being pivotally secured adjacent one end thereof to said visor.

3. In combination, a cap having a visor extending therefrom, a glareproof eyeshield, means for mounting said eyeshield on the underside of said visor including a pair of tracks, each of said tracks being pivotally secured in spaced relation on said visor, a pair of members, each of said members comprising a ball portion and a base portion spaced from said ball portion, means on each track for slidably engaging the base portion of one of said pair of members, said base portion being rotatable about an axis perpendicular to the plane of said visor, and a pair of members fixed on spaced portions of said eyeshield, each of said last mentioned pair of members including a socket portion frictionally engaging the ball portion of one of said first mentioned pair of members.

4. Mounting means comprising frictionally interengaged ball and socket members, and a track member, one of said interengaged members including means slidably and rotatably engaging said track member, said track member being designed for pivotal mounting at one end thereof to the visor of an article of headwear.

5. In combination, a cap having a visor extending therefrom, a glareproof eyeshield, track means pivotally mounted on said visor for movement from side to side thereof, a pair of universally interengaging members, one of said members including means slidably and rotatably mounted on said track means, and means for securing the other of said members to said eyeshield.

MORRIS L. TANNENBAUM.

References Cited in the file of this patent

UNITED STATES PATENTS

| Number | Name | Date |
|---|---|---|
| 264,574 | Shone | Sept. 19, 1882 |
| 1,709,765 | Auel | Apr. 16, 1929 |
| 2,004,701 | Livengood | June 11, 1935 |
| 2,475,471 | Brown et al. | July 5, 1949 |